(12) United States Patent
Langhammer (10) Patent No.: US 7,587,614 B1
(45) Date of Patent: Sep. 8, 2009

(54) ENCRYPTION ALGORITHM OPTIMIZED FOR FPGAS

(75) Inventor: Martin Langhammer, Wilts (GB)

(73) Assignee: Altera Corporation, San Jose, CA (US)

( * ) Notice: Subject to any disclaimer, the term of this patent is extended or adjusted under 35 U.S.C. 154(b) by 758 days.

(21) Appl. No.: 11/216,583

(22) Filed: Aug. 30, 2005

(51) Int. Cl.
*H04L 9/32* (2006.01)
*H04K 1/04* (2006.01)

(52) U.S. Cl. .......................... 713/189; 713/190; 380/37

(58) Field of Classification Search .................. 380/42, 380/265, 239, 28, 37, 44, 277; 713/174, 713/189–190, 193
See application file for complete search history.

(56) References Cited

U.S. PATENT DOCUMENTS 6,088,800 A * 7/2000 Jones et al. ................. 713/189
7,092,525 B2 * 8/2006 Matchett et al. ............... 380/29

* cited by examiner

*Primary Examiner*—Hosuk Song
(74) *Attorney, Agent, or Firm*—Townsend and Townsend and Crew LLP (57) ABSTRACT

Circuits, methods, and apparatus for encrypting and decrypting data using a field programmable gate array. The underlying encryption algorithm is tailored for implementation using programmable logic elements such as lookup tables or macrocells. A specific embodiment of the present invention provides a method of encryption that is optimized for implementation using a reduced number of lookup tables. The method makes efficient use of a long key, 512 bits in a specific embodiment, and incorporates substitution or S-boxes, input whitening, permutation, and a variable number of rounds.

26 Claims, 11 Drawing Sheets

ENCRYPTION ALGORITHM OPTIMIZED FOR FPGAS

BACKGROUND

The present invention relates generally to data encryption, and more particularly to data encryption algorithms optimized for implementation in field programmable gate arrays.

The concept of property has moved beyond its original boundary of the physical to encompass the intangible, such as digital information. This type of property has a distinct vulnerability: it may be replicated and distributed with complete accuracy. Accordingly, protection for digital property that prevents copying has been sought. To this end, data encryption has been increasingly turned to.

Different types of digital information property have value for different reasons. Some data is important because in the wrong hands, it can be used for nefarious purposes, such as to steal money. This data includes bank records, passwords, identity numbers, and the like. Other digital data has inherent value, such as trade secrets, customer lists, and configuration bitstreams for field programmable gate arrays. The theft of other types of data such as movies and music may result in lost sales. Encryption can be used to protect each of these types of data, and to help prevent the economic consequences of their theft.

Much of this data is provided or received by field programmable gate array devices. Accordingly, it is desirable to incorporate encryption (and decryption) circuitry in field programmable gate arrays. In some cases, it may be desirable to include the encryption circuitry with other functions in a programmable device. For example, in a data transmitter, it may be desirable to encrypt data before transmission. In other cases, the encryption circuit may be the only circuitry (along with any necessary input and output circuits) on a programmable device.

While great strides have been made in the number of programmable elements in field programmable gate arrays such as those made by Altera Corporation in San Jose, Calif., they are still finite in number. Thus it is desirable to implement encryption using a reduced number of programmable elements. Also, if encryption can be implemented using fewer programmable elements, a smaller programmable device can be used, thus reducing costs.

Thus, what is needed are encryption techniques that can be efficiently implemented on a field programmable gate array without consuming a large number of programmable elements.

SUMMARY

Accordingly, embodiments of the present invention provide circuits, methods, and apparatus for encrypting and decrypting data using circuitry on a field programmable gate array. The underlying encryption algorithm is tailored for implementation using programmable logic elements such as lookup tables (LUTs) or macrocells (MCs).

A typical embodiment of the present invention provides a method of encryption that is optimized for implementation using a reduced number of lookup tables. The method makes efficient use of a long key, 512 bits in a specific embodiment, and incorporates substitution or S-boxes, input whitening, permutation, and a variable number of rounds.

Various embodiments may be included with other functions on a field programmable gate array or other programmable or configurable device. For example, an encryption circuit according to an embodiment of the present invention may be used to decrypt an encrypted configuration bitstream or program object file received from a configuration device or memory.

Other embodiments may provide an encryption or decryption function where this is the sole or primary function on a field programmable gate array or other programmable or configurable device. For example, a software program may require that a device, known as a security dongle, be attached to the computer that is running the program. This security dongle can be programmed to properly decrypt data provided by the software program, and the software can be programmed to be disabled if the data is not properly decrypted. In this way, the security dongle can be used as a key that disables the software when removed. Various embodiments of the present invention may incorporate one or more of these or the other features described herein.

A better understanding of the nature and advantages of the present invention may be gained with reference to the following detailed description and the accompanying drawings.

BRIEF DESCRIPTION OF THE DRAWINGS

FIG. 8A is a more detailed block diagram of the left multiplexer block of FIG. 6, while

FIG. 9A is a more detailed block diagram of the right multiplexer and left side addition blocks of FIG. 6, while FIG. 9B illustrates an implementation of the right multiplexer and left side addition blocks of FIG. 6 using a four input lookup table;

FIG. 10A is a more detailed block diagram of the permutation and key addition block of FIG. 6, while FIG. 10B illustrates an implementation of the permutation and key addition block of FIG. 6 using a four input lookup table;

FIG. 11A is a more detailed block diagram of the substitution boxes used in FIG. 6, while

DESCRIPTION OF EXEMPLARY EMBODIMENTS

Figure 1:
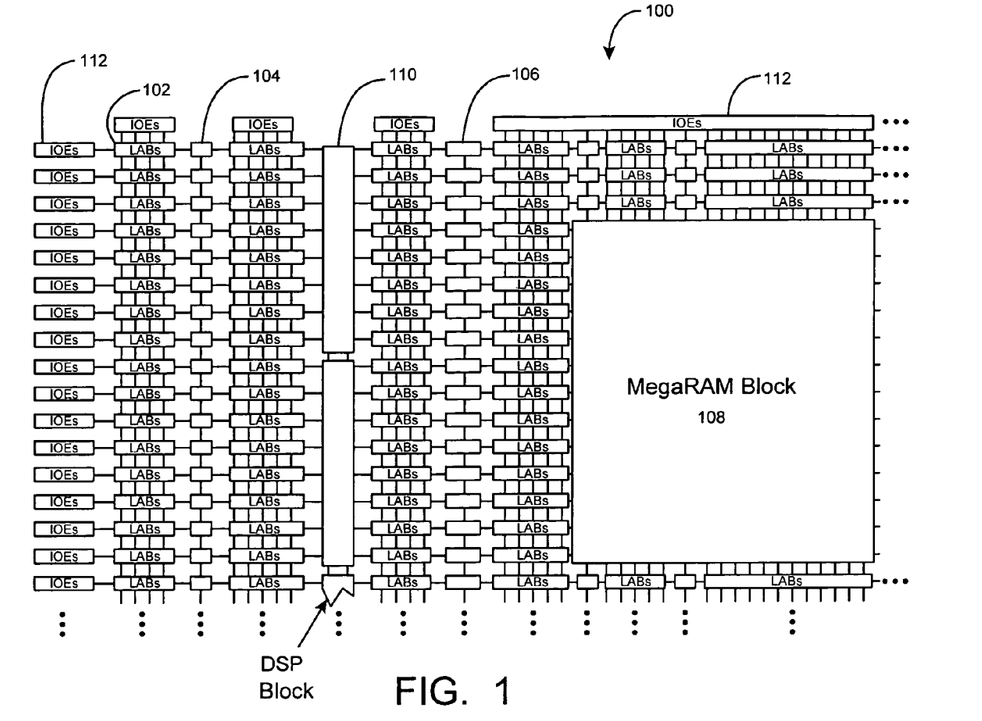
FIG. 1 is a simplified block diagram of a programmable logic device that is improved by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106, and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
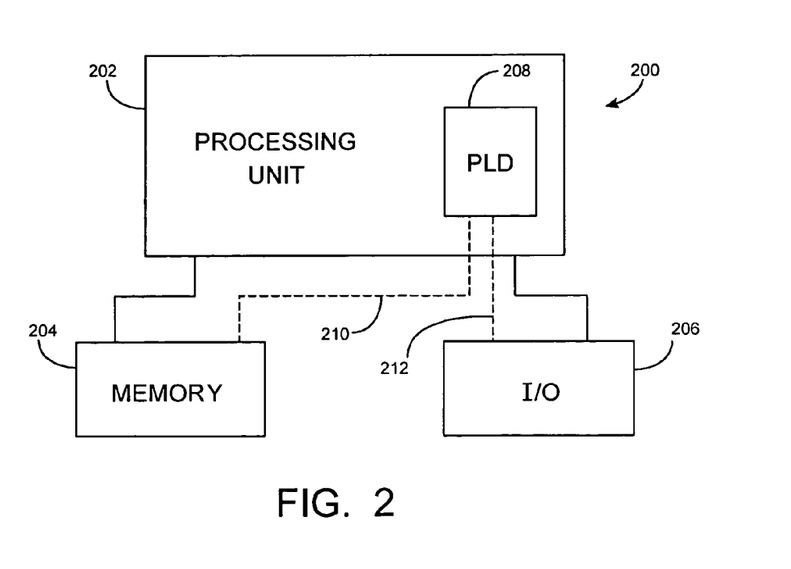
FIG. 2 is a block diagram of an electronic system that is improved by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3A:
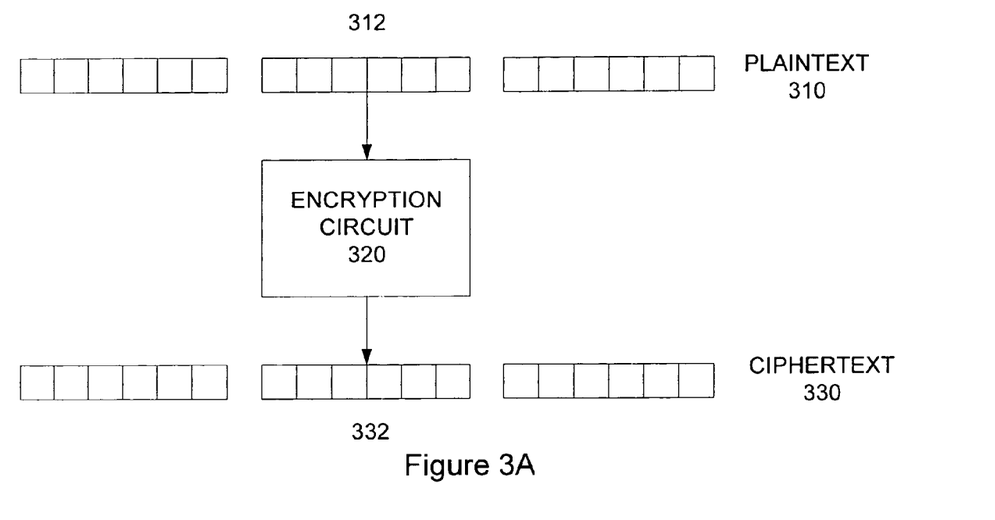
FIGS. 3A and 3B illustrate the function of an encryption circuit that is improved by incorporating embodiments of the present invention.

FIGS. 3A and 3B illustrate the function of an encryption circuit that is improved by incorporating embodiments of the present invention. In FIG. 3A, plaintext data is received and encrypted by encryption circuit 320 resulting in encrypted data or ciphertext 330. Specifically, the plaintext 310 is divided into a number of portions or blocks 312, which are received by the encryption circuit 320. The encryption circuit 320 encrypts each block 312 of the plaintext 310 into a block 332 of the ciphertext 330.

Figure 3B:
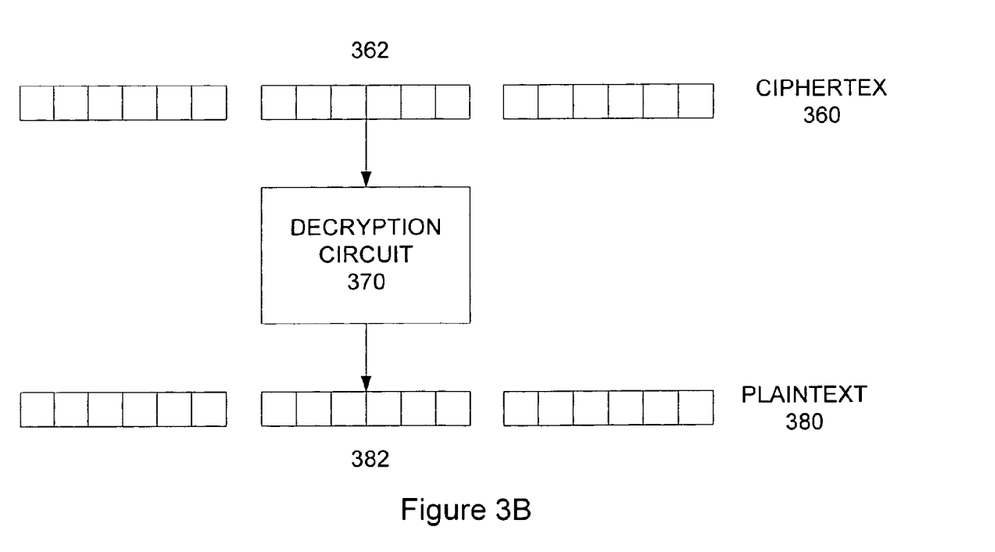

In FIG. 3B, the process is reversed. Specifically, ciphertext 360 is decrypted back into plaintext 380. The ciphertext 360 is divided into a number of portions or blocks 362. These blocks 362 are received by the decryption circuit 370, which the decrypts the ciphertext into a plaintext block 382. Typically, the encryption circuitry 320 and decryption circuitry 370 are the same circuit, where the order of the steps used for encryption is reversed for decryption.

Figure 4:
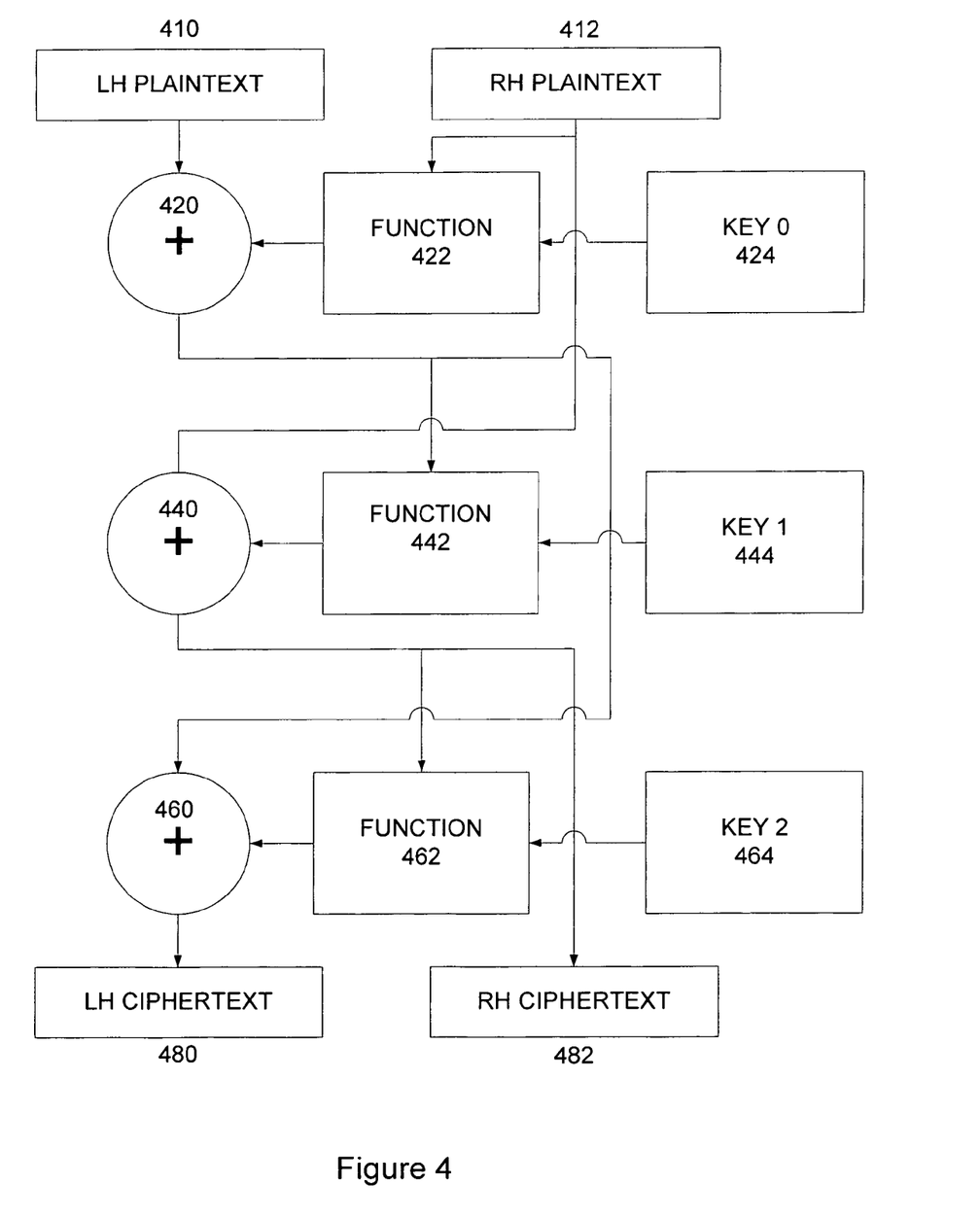
FIG. 4 illustrates the data flow through the encryption circuit of FIGS. 3A and 3B.

FIG. 4 illustrates the data flow through the encryption circuit of FIGS. 3A and 3B. Each portion or block of a plaintext is divided into a left-hand 410 and right hand 412 portions. In this figure, data flows from top to bottom, dropping down one level each clock cycle. On a first clock cycle, the right hand plaintext 412 is received by a function block 422 along with a portion of the key 424. The function block 422 performs a function on the right hand plaintext 412 and key portion 424, and provides an output to the addition block 420. The addition block sums the output of the function block 422 with the left-hand plaintext portion 410.

The output of the addition block 420 is received by the function block 442 along with second portion of the key 444. The function block 442 operates on the output of the addition block 420 and the key portion 444 and provides an output to the addition block 440. The addition block 440 receives the right hand plaintext 412 and the output of the function block 442, and provides an output to the function block 462. This output is also the right hand ciphertext 482. The function block 462 receives the output of the addition block 440 and a third portion of the key 464 and provides an output to the addition block 460. The output addition block 460 receives the output of the addition block 420 and the function block 462 and provides the left-hand ciphertext portion 480.

In this particular example, only three rounds of encryption are shown for simplicity. In typical embodiments, more than three rounds are used. In some embodiments, the number of rounds is variable. In a specific embodiment, the number of rounds may be varied from 16, 32, 48, or 64. In other embodiments, other numbers of rounds may be used, and the number of rounds may or may not be variable.

Also in this is example, the function blocks 422, 442, and 462 are shown as separate function blocks, though in practical circuits only one function block is used in a repetitive manner. Similarly, the addition blocks 420, 440, and 460 are one addition block in practical circuits. A circuit that performs these functions is shown in the following figure.

Figure 5:
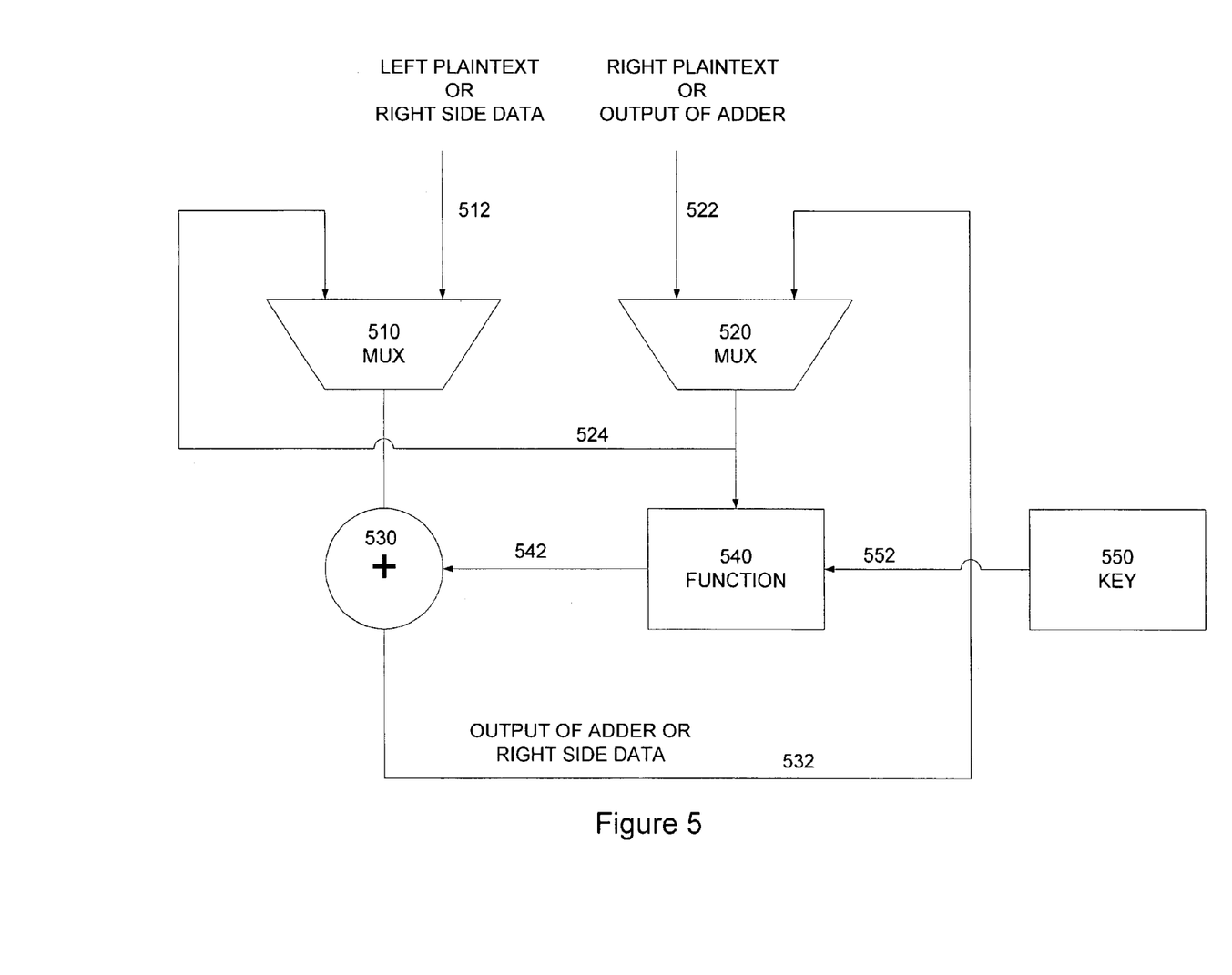
FIG. 5 is a block diagram of a circuit that may be used to implement the data flow through the encryption circuit of FIGS. 3A and 3B according to an embodiment of the present invention.

FIG. 5 is a block diagram of a circuit that may be used to implement the data flow through the encryption circuit of FIGS. 3A and 3B according to an embodiment of the present invention. This block diagram includes multiplexers 510 and 520, addition block 530, function block 540, and key memory 550.

The left side plaintext or right side data is received on lines 512 by the multiplexer 510. The right side plaintext or adder output is received on lines 522 by the multiplexer 520. The output of the multiplexer 510 is received by the addition block 530, while the output of the multiplexer 520 is received by the function block 540 and multiplexer 510. The function block 540 also receives the key from the key memory 550 on lines 552. The output of function block 540 on line 542 is received by the addition block 530.

The output of the addition block 530 is provided on lines 532, which are selectively coupled back to the input of the multiplexer 520 on lines 522 and the right side data, which is received by the multiplexer 510 on lines 512.

Figure 6:
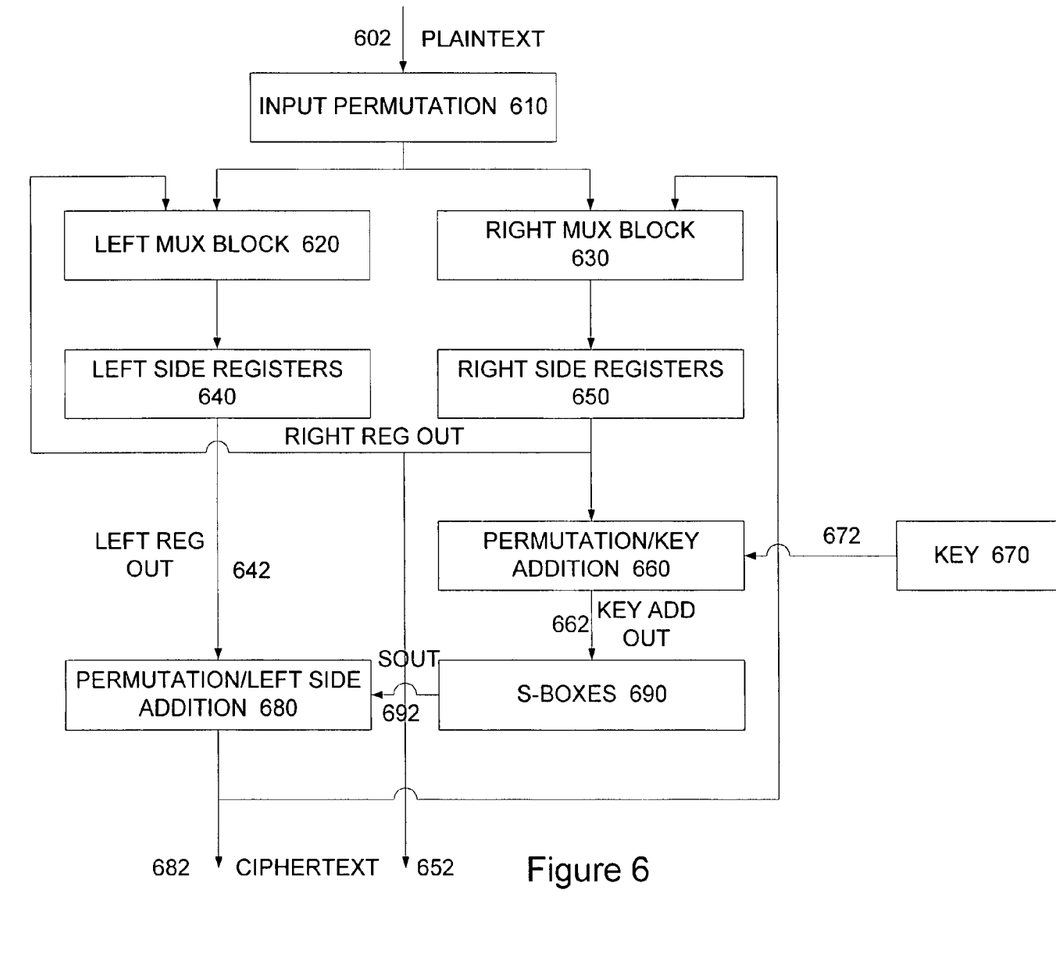
FIG. 6 is a block diagram of an encryption circuit according to an embodiment of the present invention.

FIG. 6 is a more detailed block diagram of the encryption circuit of FIG. 5 according to an embodiment of the present invention. The circuit in this figure is one of a class of encryption circuits known as Feistel network. These networks are reversible, that is, they may be used for both encryption and decryption. During encryption, the key is addressed in one direction, while during decryption, the key is addressed in an opposite direction. This may be achieved, for example, by using an up/down counter. In this figure, the function block is implemented as a permutation key addition circuit 660 and a plurality of substitution boxes 690. The permutation circuitry 660 provides "diffusion," while the substitution boxes 690 provide "confusion." This figure, as with the other included figures, a shown for illustrative purposes and does not limit either the possible embodiments of the present invention or the claims.

This figure includes input permutation blocks 610, left multiplexer block 620, right multiplexer block 630, left side registers 640, right side registers 650, permutation and key addition circuit 660, key memory 670, permutation and left side addition circuit 680, and substitution boxes 690. In this and other figures encryption of data is shown, though it is to be understood that the circuits can be used to decrypt encrypted data.

Plaintext or unencrypted data is received on lines 602 by the input permutation block 610. The input permutation circuit may be implemented in a field programmable gate array by connecting interconnect and lines in such a way as to permutate the plaintext data received on lines 602. The diffused input plaintext 610 is split and provided to a left multiplexer block 620 and right multiplexer block 630. In one embodiment, the diffused input plaintext is split evenly or symmetrically, while in other embodiments an asymmetric split may be used. In an exemplary embodiment, 64 bits of plaintext (or ciphertext if decryption is being performed) are received by the left multiplexer block 620 and right multiplexer block 630. In other embodiments, other numbers of bits may be received. For example, blocks of plaintext that are 32, 48, or 128 bits may be received. In other embodiments, other numbers of bits may be used, and these numbers may be binary or non-binary.

Input whitening may be optionally applied at the input of the left multiplexer block 620 and right multiplexer block 630. This whitening can include permutation of the input data. It may alternately or further include key addition where the key is fixed in the look-up table programming during configuration. In this way, input whitening can be included in the look-up table equations for either or both the right and left side multiplexers, thus requiring no additional area for its implementation.

To provide synchronization of the data through this circuitry, the output of the left multiplexer block 620 and right multiplexer block 630 are retimed by left side registers 640 and right side registers 650 respectively. The output of the left side registers 640 is provided to the permutation left side addition block 660, while the right side registers 650 provide an output to the function circuitry.

Again, and this specific embodiment, the function circuit is implemented as a permutation key addition block 660 and substitution boxes 690. The permutation key addition circuit 660 receives the right side register output and a portion of the key 670 on lines 672, and provides an output on lines 662 to the substitution boxes 690. The substitution boxes 690 substitutes a received data value for a second data value and provides an output on lines 692 to the permutation left side addition block 660. The permutation left side addition block 660 provides an output to the right multiplexer block 630, while the right side register 650 output is fed back to the left multiplexer block 620. After a certain number of rounds of the encryption process have been performed on the plaintext 602, the ciphertext is output from the permutation left side addition block 660 and the right side registers 650 on lines 682 and 652 respectively.

During each round, a portion of the key stored in key memory 670 is provided on lines 672 to the permutation key addition circuit 660. The key portions are provided according to what is known as a key schedule. This key schedule may be as simple as providing a certain number of bits for each round, or it may be more complex. For example, the portions of the key 670 provided to the permutation key addition circuit 660 may depend on the values of the key itself, or may be scheduled in another manner. The key may be stored in a number of look-up tables. These look-up tables can be implemented as ROMs, RAMs, or other types of memories. In other embodiments, the key can be stored in memories, such as SRAMs, or in registers, latches, or other memory or data storage circuits. In a specific embodiment, the key is 512 bits, though other lengths of keys may be used. Where 512 bits are used, 16 rounds of encryption of a 64 bit plaintext word can be supported, where the plaintext word is symmetrically split. In other embodiments, other numbers of key lengths, rounds of encryption, and size of plaintext words may be used, and the split may be symmetrical or asymmetrical. Again, during encryption the key may be addressed in one direction, while it is addressed in a reverse direction during decryption.

In this particular example, the plaintext on lines 602 is encrypted into ciphertext on lines 682 and 652. Again, since this is a Feistel network, this same circuitry may be used to decrypt ciphertext into plaintext.

Again, it is very desirable to implement this circuitry using a minimum amount of resources on a field programmable gate array or other configurable or programmable device. Accordingly, this circuit has been optimized for implementation using programmable elements such as a lookup table or macrocell.

Figure 7:
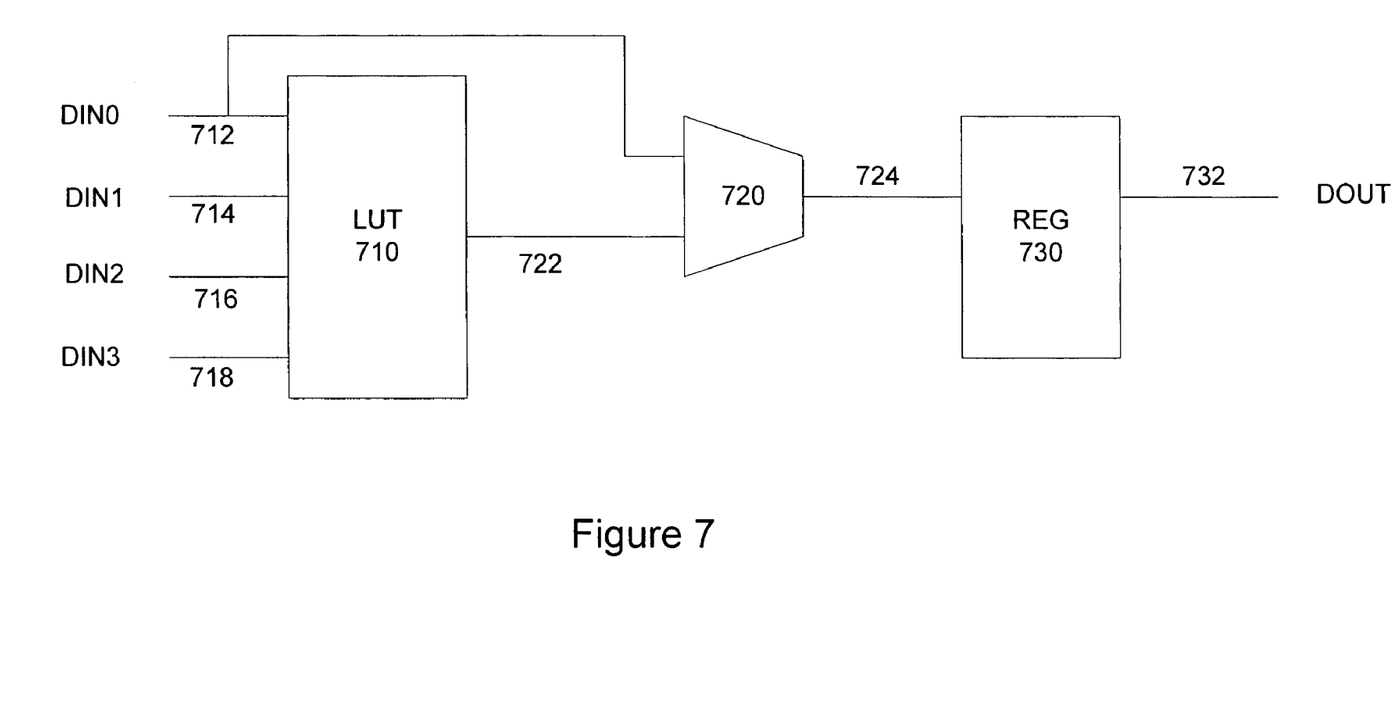
FIG. 7 is a lookup table and associated circuit that may be used to implement the circuit of FIG. 6.

FIG. 7 is a lookup table and associated circuit that may be used to implement the circuit of FIG. 6. This circuit includes a lookup table 710, multiplexer 720, and registers 730. Data inputs are received on lines 712, 714, 716, and 718 by the lookup table 710. These four data values address one of 16 locations in a memory that forms lookup table 710. The output of the lookup table 710 is provided on line 722 to the multiplexer 720. Multiplexer 720 selects between the output of the lookup table on line 722 and one of the data inputs on line 712, and provides an output on line 724 to register 730. The register 730 retimes the data on line 724 and provides an output on line 732.

It will be appreciated by one skilled in the art that this is a highly simplified schematic showing only a few essential features of a programmable element that is used in a field programmable gate array, such as those designed and developed by Altera Corporation of San Jose, Calif. It will also be appreciated by one skilled in the art that other types of programmable elements, such as macrocells, again developed by Altera Corporation of San Jose, Calif., may be used in the place of the lookup table circuitry shown in FIG. 7

Figure 8A:
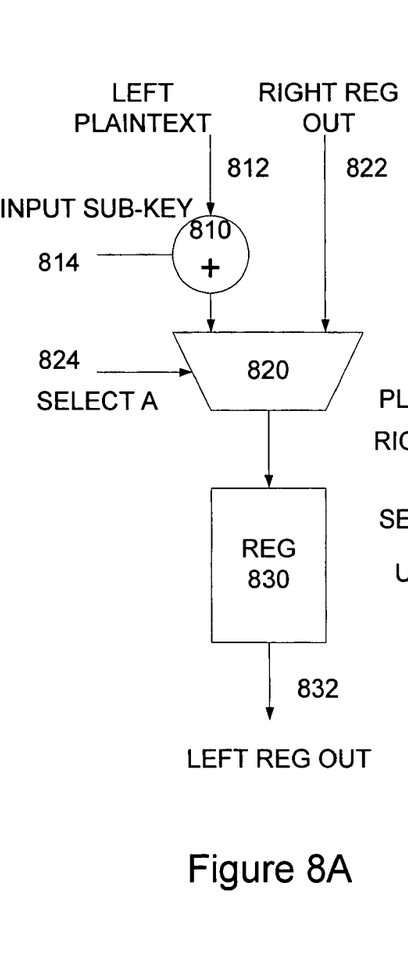

FIG. 8A is a more detailed block diagram of the left multiplexer block of FIG. 6. This block diagram also includes the left side registers 630 from FIG. 6. This diagram includes an addition block 810, multiplexer 820, and register 830. The left plaintext is received on line 812 by the addition circuit 810. An input sub-key is received on line 814 by the addition block 810. The input sub-key provides input whitening and may be provided during device configuration.

The multiplexer 820 selects between an output of the addition block 810 and the right side register output data on lines 822, and provides an output to the register 830. The register 830 corresponds to the left side registers 640.

Figure 8B:
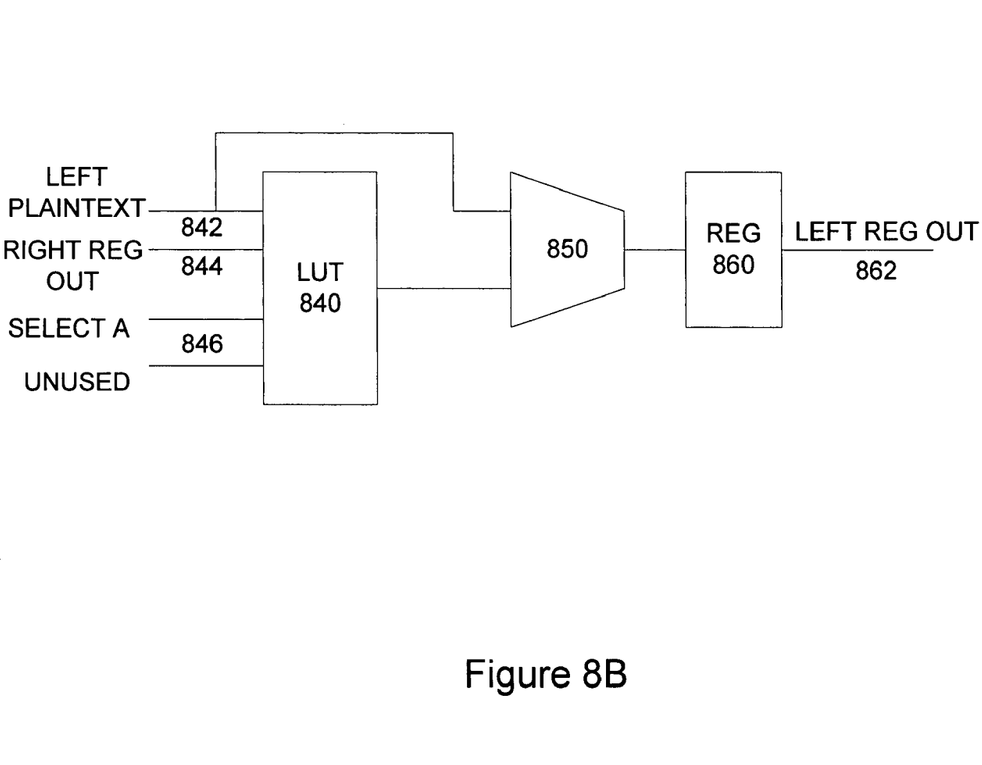
FIG. 8B illustrates an implementation of the left multiplexer block of FIG. 6 using a four input lookup table.

FIG. 8B illustrates an implementation of the left multiplexer block 620 of FIG. 6 using a four input lookup table. While only one lookup table is shown, it is to be understood that a number of lookup tables are used to implement the left multiplexer block. The number of lookup tables used depends on the number of plaintext bits that can be encrypted at one time. In a specific embodiment of the present invention, 64 bits of plaintext are received at a time, 32 bits by the left multiplexer block 620 and 32 bits by the right multiplexer block 630. In this specific embodiment, 32 programmable elements, that is, 32 lookup tables or macrocells are used for the left multiplexer block 620. In other embodiments, other numbers of bits are received by this circuit, and thus other numbers of programmable elements are required for its implementation.

The left plaintext, right register output, and select signals are received on lines 842, 844, and 846 respectively by lookup table 840. The output of the lookup table 840 is provided to the register 860 via the multiplexer 850. The register 860 provides the left register output on line 862. The input whitening function is provided by the lookup table 840.

Figures 9A, 9B:
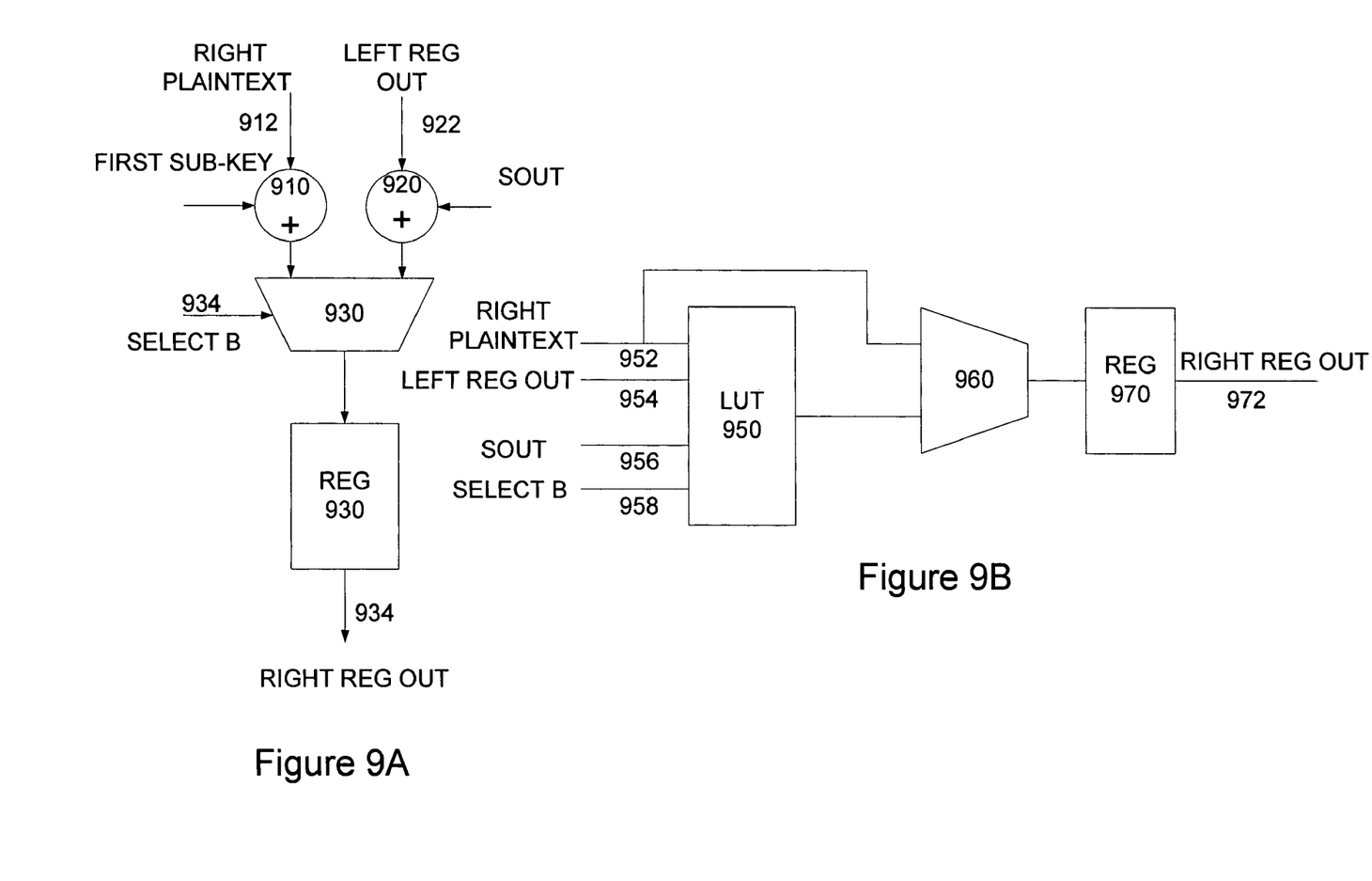

FIG. 9A is a more detailed block diagram of an implementation of the left side addition 680 and right multiplexer 630 blocks of FIG. 6. This diagram also includes the right side registers 640 from FIG. 6. The left side addition block 680 is incorporated as part of the right multiplexer block 630 in this particular implementation, though in other embodiments they may be separate. In other embodiments, other circuit blocks may be combined in various manners. The left register outputs and the output of the S-boxes 690 or summed by addition circuit 920. The right plaintext and first sub-key are summed by addition circuit 910. The multiplexer 930 selects between the outputs of the addition circuits 910 and 920 and provides an output to the register 930. The right side registers 930 provides the right register out signal on line 934.

FIG. 9B illustrates an implementation of the right multiplexer and left side addition blocks of FIG. 6 using a four input lookup table. Again, while only one lookup table is shown, it is to be understood that a number of lookup tables are used to implement the right multiplexer block. In a specific embodiment of the present invention, 64 bits of plaintext are encrypted at a time, so 32 bits are received by the right multiplexer block 630. In this specific embodiment, 32 programmable elements, that is, 32 lookup tables or macrocells, are used for the right multiplexer block 630. Again, in a specific embodiment, the number of bits received by the left multiplexer block 620 and right multiplexer block are equal, though in other embodiments they are not equal.

As can be seen, the addition circuits 910 and 920, multiplexer 930, and register 930 can be implemented using a number of programmable elements such as the lookup table based programmable element as shown in FIG. 9B. The right plaintext, left register output, SOUT, the output from the S-Boxes, and select line SELECT B are received on the lines 952, 954, 956, and 958 by lookup table 950. The output of the lookup table 950 is received by the register 970 via the multiplexer 960. The register 970 provides the right register output on line 972.

Figures 10A, 10B:
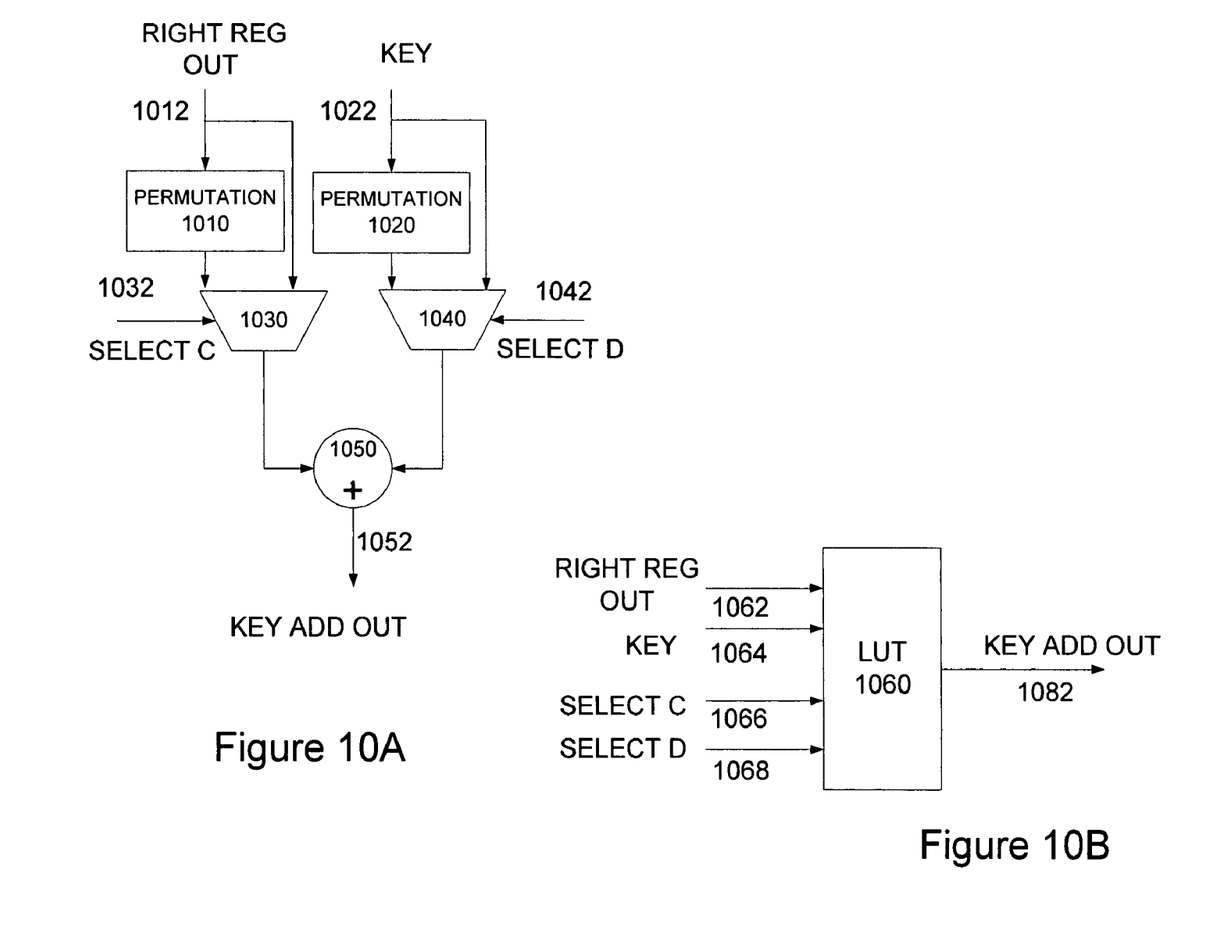

FIG. 10A is a more detailed block diagram of the permutation and key addition block of FIG. 6. The function of the circuit is to add to the right register output on line 1012 with the key on line 1022 on a bit-per bit basis. Accordingly, when a number of four input lookup tables are used, 2 inputs of each of the lookup tables are unused and available. These extra inputs can receive other bits from the right register output and key, and thus be used to further permutate this data. This causes the plaintext data to diffuse at a faster rate.

Since there are two inputs, each of which can be selected from two possibilities, there are four possible combinations that can be selected. In one embodiment, the four possible combinations are used to support four different numbers of rounds. For example, one combination is selected for an implementation using 16 rounds. By permutating the inputs, a unique sub-key can be generated for up to 64 rounds.

As before, the number of lookup tables and corresponding programmable elements used depends on the size of the plaintext data to be encrypted. In one embodiment, this function uses 32 lookup tables, though other numbers of lookup tables can be used by various embodiments.

It is important to note that while the term "addition" is used, the addition provided by these circuits is the same as an exclusive-OR function, and these terms may be used interchangeably.

FIG. 10B illustrates an implementation of the permutation and key addition block of FIG. 6 using a four input lookup table. The right register output, key, SELECT C, and SELECT D inputs are received on lines 1062, 1064, 1066, 1068 by lookup table 1060. The lookup table 1060 provides the key addition output on line 1082 to the S-Boxes, an implementation of which is shown in the following figures.

In this implementation, the key addition is done using one level of logic. Alternately, more than one level of logic can be used. For example, in this example, more than one look-up table in series can be used to implement this function. The permutation of input data and the sub-key can be done in routing, for example, using programmable interconnect lines, pass gates, tristate gates, or other appropriate structures.

Figure 11A:
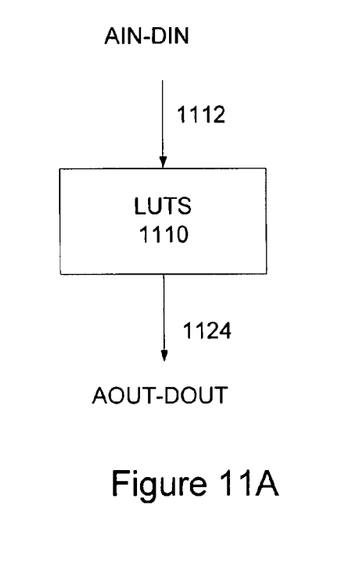

FIG. 11A is a more detailed block diagram of the substitution boxes used in FIG. 6. These S-Boxes are configured as four-input to four-output substitution boxes. Specifically, four data bits, or addresses, are received on lines 1012 by lookup tables 1110, which in turn provides an output on lines 1124. The entries in the substitution boxes are user definable. In typical embodiments, the S-Boxes contain each of the numbers 0-15, without repetition. The S-Box entries may be randomly selected, or they may be selected based on rules or other design criteria. In a specific embodiments, each number is used once and only once for each S-Box and the numbers are not a linear function of input address. The selection of entry values for the S-Boxes does effect the robustness of the encryption algorithm, though this selection does not change the architecture of the encryption circuit.

Figure 11B:
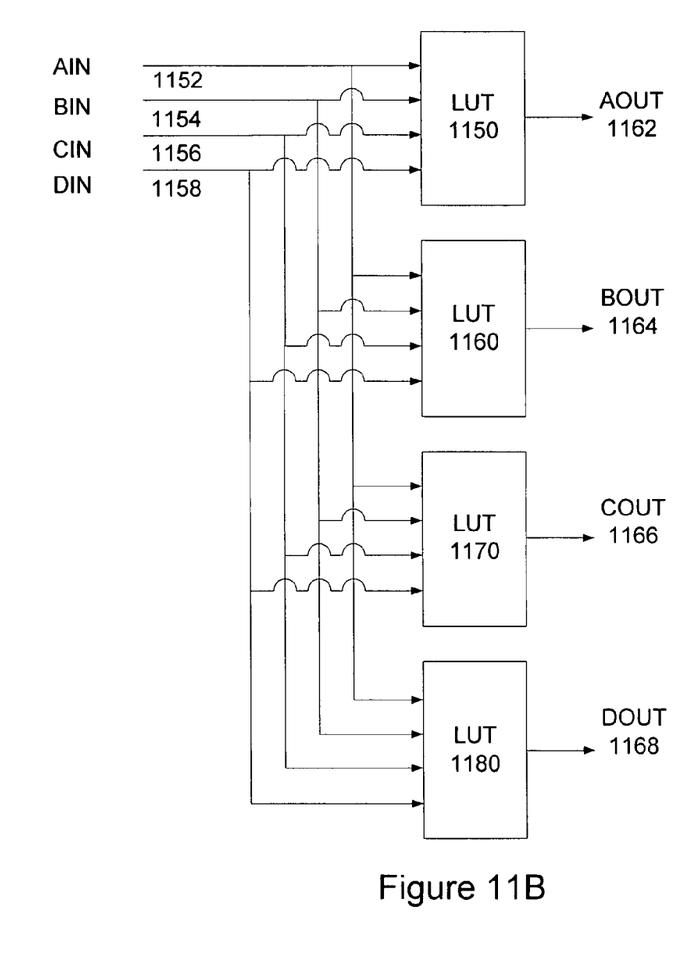
FIG. 11B illustrates an implementation of the substitution boxes of FIG. 6 using four 4-input lookup tables.

FIG. 11B illustrates an implementation of the substitution boxes of FIG. 6 using four 4-input lookup tables. Each of the four inputs, AIN, BIN, CIN, and DIN are received by lookup tables 1150, 1160, 1170, and 1180. The output of the lookup tables are provided on lines 1162, 1164, 1166, and 1168. In a particular embodiment, 32 lookup tables, and corresponding programmable elements are used in implementing these S-Boxes, though in other embodiments, other numbers may be used, and they may be configured as S-Boxes having a different number of inputs and outputs.

Figure 12:
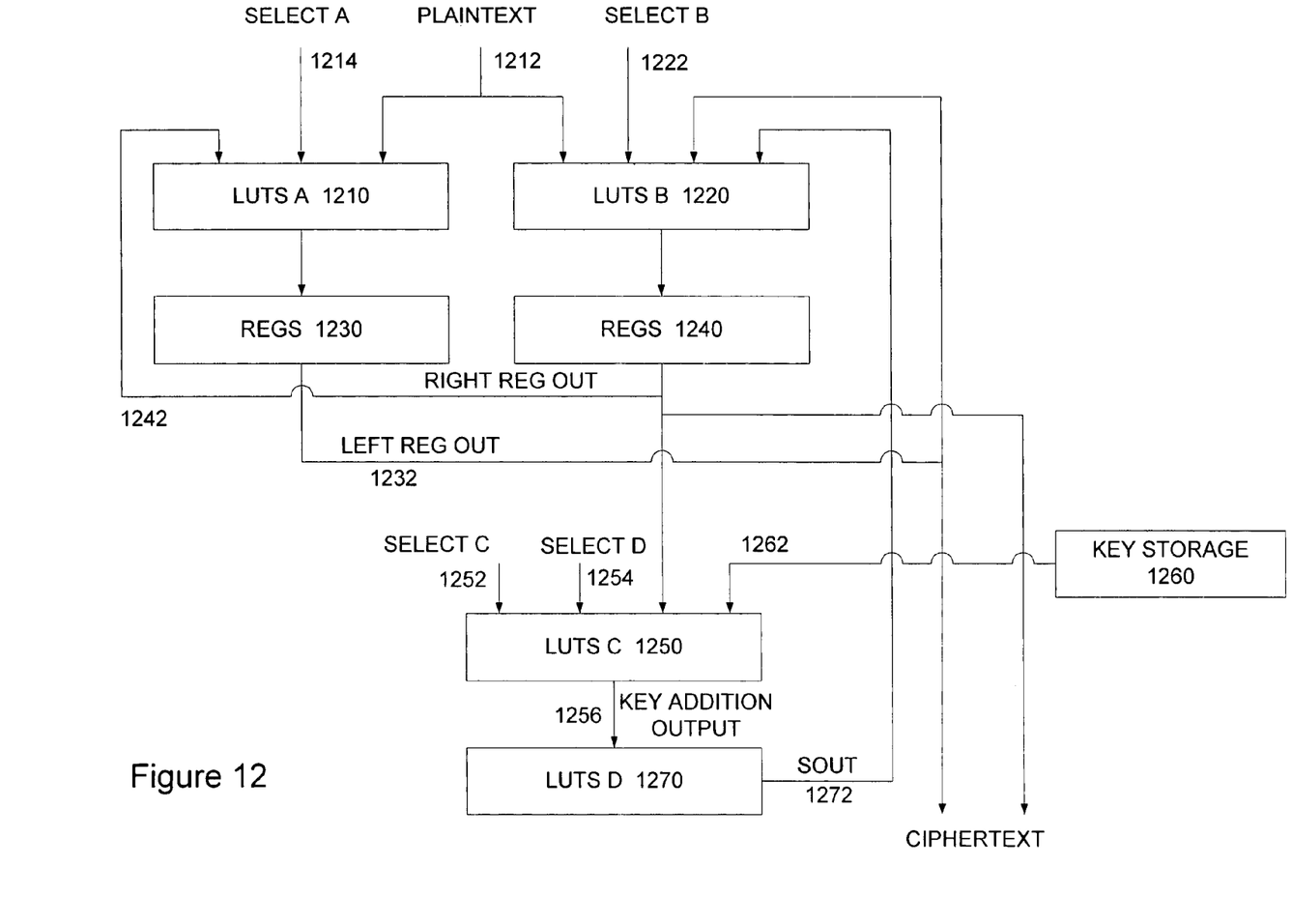
FIG. 12 is a block diagram showing the circuitry of FIG. 6 implemented using a number of lookup tables.

FIG. 12 is a block diagram showing the circuitry of FIG. 6 implemented using a number of lookup tables. This figure includes the lookup tables A 1210, lookup tables B 1220, register 1230 and 1240, lookup tables 1250, lookup tables at the 1270, and key storage 1260.

The plaintext is received on lines 1212 by lookup tables A 1210 and lookup tables B 1220. The plaintext may first be defused by permutation using a plurality of interconnect lines such that the order of the plaintext bits are diffused before being received by the lookup tables A 1210 and lookup tables B 1220.

The control or select line SELECT A on line 1214 and SELECT B on line 1222 control the selection of the input bits to the lookup tables A 1210 and lookup tables B 1220. Specifically, part of the function of the lookup tables A 1210 and lookup table B 1220 are to provide a multiplexing function under the control of the select lines. The select lines SELECT A and SELECT B on lines 1214 and 1222, along with the select lines SELECT C and SELECT D on lines 1252 and 1254, are provided by a control circuit (not shown). The control circuit may also include a round counter that tracks the number of rounds of encryption or decryption. In various embodiments, various numbers of rounds may be used. Further, this number may be fixed or variable.

Conceptually, this control circuit controls the selection of inputs at these various circuits. In embodiments where lookup tables are used to implement these functions, the select lines do not control the selection of an input signal directly, as in an actual multiplexer, rather an entry in lookup table is found based in part of the state of the select line or lines.

The output of the lookup tables A 1210 and B 1220 are retimed by registers 1230 and 1240. Again, in a specific embodiment, the registers 1230 and 1240 are included in programmable elements that also include the lookup tables A 1210 and B 1220.

The outputs of the registers 1230 are provided as part of the ciphertext, and is also provided to the lookup tables B 1220. The output of the registers 1240 are provided as the remaining portion of the ciphertext, and is routed back to the lookup tables A 1210. The output of the registers 1240 are also received by lookup tables C 1250. The lookup tables C 1250 perform the key addition and further permutation function. The permutation of the output of the registers 1240 is controlled by the SELECT C signals on lines 1252, while the permutation of the key on lines 1262 is controlled by the select signals SELECT D on lines 1254.

The output of lookup tables C 1250 are provided to the lookup tables D 1270. The lookup tables D 1270 are configured as S-Boxes, for example those shown in FIGS. 11A and 11B. The output of the lookup tables D, SOUT on lines 1272, can be permutated or circularly shifted before being received by lookup tables B 1220. This can be done using programmable interconnect lines such that the area and speed of the circuit is not effected.

This arrangement provides a very fast and highly utilized implementation in a field programmable gate array. The longest logic path is three logic levels from register to register. Specifically, data from a register passes through the key addition circuit, S-Boxes, and multiplexer circuits before reaching the next register. Also, in a specific implementation where four-input lookup tables are used, each input of each lookup table is used in the encryption circuit core.

This architecture also provides a highly flexible encryption circuit core that can be easily modified in software with only a limited amount of designer input. For example, a symmetrical or asymmetrical split can be specified with a single bit. Using two parameters, one to specify the input split and one to identify the plaintext width, the core can be resynthesized from a single VHDL description into myriad configurations. In one embodiment, any unused circuitry in the key addition, S-Boxes, and left side addition blocks can be removed during synthesis. Alternately, a unique core can be designed for each application. For example, the permutation configurations and S-Box contents can be redesigned for each application.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
a plurality of programmable elements, configurable to perform user-defined functions;
a plurality of interconnect lines, configurable to interconnect the plurality of programmable elements;
wherein a first number of the plurality of programmable elements and a second number of the plurality of interconnect lines are configure to perform an encryption function, the encryption function comprising:
a permutation circuit;
a plurality of substitution boxes; and
an addition circuit,
wherein the permutation circuit and addition circuit are implemented using a first plurality of lookup tables, wherein the first plurality of lookup tables receive text to be encrypted, a key to use for the encryption, and a first and second select signal, wherein the first select signal selects between the text and a permutation of the text, and wherein the second select signal selects between the key and a permutation of the key.

2. The integrated circuit of claim 1 further comprising an encryption key memory configured to store an encryption key.

3. The integrated circuit of claim 2 wherein the encryption key memory is configured to provide the encryption key to the permutation circuit.

4. The integrated circuit of claim 1 wherein the plurality of substitution boxes are implemented using a second plurality of lookup tables.

5. The integrated circuit of claim 4 wherein the lookup tables are four input lookup tables.

6. The integrated circuit of claim 1 wherein the encryption function operates on a block of plaintext, and each block of plaintext is 64 bits in size.

7. The integrated circuit of claim 1 wherein the encryption function operates on a block of plaintext, and each block of plaintext is selected from the group consisting of 32, 48, 64, or 128 bits.

8. The integrated circuit of claim 1, wherein the text to be encrypted is cipher text that has already been encrypted at least once.

9. A method of encrypting plaintext using a field programmable gate array, the method comprising:
receiving a first plurality of plaintext bits with a first plurality of programmable elements;
receiving a second plurality of plaintext bits with a second plurality of programmable elements;
transmitting a first plurality of outputs from the first plurality of programmable elements;
receiving the first plurality of outputs with the second plurality of programmable elements;

receiving a second plurality of outputs from the second plurality of programmable elements with a third plurality of programmable elements;

receiving a third plurality of outputs from the third plurality of programmable elements with a fourth plurality of programmable elements; and receiving a fourth plurality of outputs from the fourth plurality of programmable elements with the first plurality of programmable elements.

10. The method of claim 9 further comprising:

receiving a plurality of bits of a key from a key memory with the third plurality of logic elements.

11. The method of claim 9 wherein the first plurality of outputs of the first plurality of programmable elements are retimed using a first plurality of flip-flops and the second plurality of outputs of the second plurality of programmable elements are retimed using a second plurality of flip-flops, wherein the first plurality programmable elements includes the first plurality of flip-flops and the second plurality programmable elements includes the second plurality of flip-flops.

12. The method of claim 11 further comprising:

providing encrypted plaintext at the outputs of the first and second plurality of programmable elements.

13. The method of claim 9 wherein the first plurality of programmable elements are lookup tables.

14. The method of claim 9 wherein the first plurality of programmable elements are macrocells.

15. The method of claim 9 wherein the first plurality of programmable elements comprises the same number of programmable elements as the second plurality of programmable elements.

16. An integrated circuit comprising:

a plurality of programmable logic elements, wherein the plurality of programmable logic elements are capable of being configured as user-defined circuits;

a plurality of programmable interconnect lines, configurable to interconnect the plurality of programmable logic elements;

wherein some of the plurality of programmable logic elements are configured as an encryption circuit, wherein the encryption circuit comprises:

a first plurality of programmable logic elements coupled to receive a first plurality of bits, the first plurality of programmable logic elements configured to perform a multiplexing function;

a second plurality of programmable logic elements coupled to receive a second plurality of bits, the second plurality of programmable logic elements configured to perform a multiplexing function;

a third plurality of programmable logic elements coupled to a plurality of outputs from the second plurality of programmable logic elements, the third plurality of programmable logic elements configured to perform an exclusive-OR function; and a fourth plurality of programmable logic elements coupled to a plurality of outputs from the third plurality of programmable logic elements, the fourth plurality of programmable logic elements configured as a plurality of substitution boxes.

17. The integrated circuit of claim 16 further comprising a first plurality of registers coupled to receive a plurality of outputs from the first plurality of programmable logic elements and a second plurality of registers coupled to receive a plurality of outputs from the second plurality of programmable logic elements.

18. The integrated circuit of claim 16 wherein the third plurality of programmable elements are configured to receive bits of a key from a key memory.

19. The integrated circuit of claim 16 wherein the first and second pluralities of bits comprise a plaintext block.

20. The integrated circuit of claim 16 wherein the first and second pluralities of bits comprise a ciphertext block.

21. The integrated circuit of claim 16 wherein the programmable logic elements comprise a lookup table and a flip-flop.

22. The integrated circuit of claim 16 wherein the encryption circuit performs an encryption algorithm, the encryption algorithm optimized for implementation using programmable elements including a four-input lookup table.

23. The integrated circuit of claim 16 wherein the first plurality of bits and the second plurality of bits each comprise the same number of bits.

24. The integrated circuit of claim 16 wherein the first plurality of bits and the second plurality of bits each comprise a different number of bits.

25. The integrated circuit of claim 16 wherein the encryption circuit comprises three levels of logic.

26. The integrated circuit of claim 16 wherein each of the plurality of logic elements comprise a lookup table, and each input to each lookup table is used.

* * * * *

UNITED STATES PATENT AND TRADEMARK OFFICE
CERTIFICATE OF CORRECTION

PATENT NO. : 7,587,614 B1 Page 1 of 1
APPLICATION NO. : 11/216583
DATED : September 8, 2009
INVENTOR(S) : Martin Langhammer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this

Twenty-first Day of September, 2010

David J. Kappos
*Director of the United States Patent and Trademark Office*